(12) United States Patent  
Sirrine et al.

(10) Patent No.: US 7,487,679 B2
(45) Date of Patent: Feb. 10, 2009

(54) VEHICLE VIBRATION ANALYZER

(75) Inventors: Scott Anthony Sirrine, Kalamazoo, MI (US); Kevin W. Marsh, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 173 days.

(21) Appl. No.: 11/125,999

(22) Filed: May 10, 2005

(65) Prior Publication Data

US 2006/0255923 A1 Nov. 16, 2006

(51) Int. Cl.
*G01N 29/024* (2006.01)
*G01P 15/00* (2006.01)

(52) U.S. Cl. .............................. 73/660; 73/593; 73/597; 73/659; 702/39

(58) Field of Classification Search .................. 73/660, 73/593, 659, 460, 650, 489, 495, 503; 702/187, 702/130, 138, 141; 340/683; 701/71, 111
See application file for complete search history.

(56) References Cited

U.S. PATENT DOCUMENTS

| 5,445,028 | A | | 8/1995 | Bianchi et al. | |
|---|---|---|---|---|---|
| 5,684,701 | A | * | 11/1997 | Breed | 701/45 |
| 6,053,047 | A | | 4/2000 | Dister et al. | |
| 6,122,959 | A | * | 9/2000 | Hoshal et al. | 73/489 |
| 6,609,053 | B1 | * | 8/2003 | Breed | 701/45 |
| 6,691,002 | B2 | * | 2/2004 | Dormegnie et al. | 701/1 |
| 6,729,186 | B1 | | 5/2004 | Sirrine et al. | |
| 6,826,509 | B2 | * | 11/2004 | Crisco et al. | 702/141 |
| 2003/0088346 | A1 | | 5/2003 | Calkins et al. | |
| 2004/0111225 | A1 | * | 6/2004 | Chin | 702/56 |
| 2005/0066730 | A1 | | 3/2005 | Raichle | |
| 2005/0177335 | A1 | * | 8/2005 | Crisco et al. | 702/141 |
| 2005/0273277 | A1 | * | 12/2005 | Ridnour et al. | 702/42 |
| 2006/0230829 | A1 | * | 10/2006 | Byrd | 73/510 |
| 2007/0119252 | A1 | * | 5/2007 | Adams et al. | 73/510 |

FOREIGN PATENT DOCUMENTS

| EP | 0355968 | 2/1990 |
|---|---|---|
| EP | 0980001 | 2/2000 |

OTHER PUBLICATIONS

International Search Report for PCT/IB2006/001226.

* cited by examiner

*Primary Examiner*—Hezron Williams
*Assistant Examiner*—J M Saint Surin
(74) *Attorney, Agent, or Firm*—Rader, Fishman & Grauer PLLC

(57) ABSTRACT

A diagnostic vibration analyzing system and method for measuring and characterizing both linear and torsional vibrations in a vehicle or a piece of industrial equipment (collectively a "vehicle"). An electronic control unit and a plurality of sensors cooperate to measure accelerations sensed by a vehicle operator. These measured accelerations, when combined with sensed rotational velocities, can be used to pinpoint likely sources of driveline vibrations. Once the sources of driveline vibrations are identified, they are graphically displayed to a user for remedial action.

10 Claims, 8 Drawing Sheets

VEHICLE VIBRATION ANALYZER

BACKGROUND

The present system and method relate generally to vehicle vibration diagnostics. In particular, the present system and method relate to evaluating and reporting possible vibration sources in a vehicle.

Vibration problems are a significant source of premature component failure, ride degradation, and noise in devices such as vehicles and industrial equipment (collectively "vehicles"). Users often replace damaged components rather than investigate the potentially ongoing root cause of the damaged component. Without addressing the root cause(s) of the component damage, the same damage is often repeated, requiring the subsequent replacement of future damaged components. Such a practice can be both time consuming and expensive.

To combat the traditional "trial and error" prior art approach of fixing vibration sources, a number of complex characterization, computational, and vibration display systems and methods have been developed. For example, U.S. Pat. No. 6,128,959 (patent '959) discloses a driveline vibration analyzer having a single sensor and single input channel for measuring, analyzing, and characterizing the torsional vibrations in a vehicle driveline. However, traditional vibration analyzers often present the results of the vibration analysis as complex charts and graphs such as signal, order-based frequency displays requiring interpretation by a test engineer or a vibration-trained expert technician.

Additionally, driveline vibration analyzers have traditionally presented the measured vibrations as frequency displays, leaving the analysis of the received information and formulation of a solution to the test engineer or vibration-trained expert technician. Correlation between the sensed vibrations and a damaged component or cause of component damage is not only conceptually difficult but is also time consuming. Further, correlating the received vibration information to a vibration source is subject to misinterpretation by the test engineer or the expert technician, resulting in lost time and potential further damage to vehicle components. Consequently, vehicle manufacturers are continuously working to improve the reliability of vibration analysis systems and the ability of systems and methods to diagnose the root-cause(s) of vehicle vibration.

SUMMARY

A tool for measuring and analyzing vehicle vibrations includes a display unit, and a processor communicatively coupled to the display unit. According to one embodiment, the processor is configured to receive sensor signals associated with a vehicle, determine vehicle vibration levels from the sensor signals, attribute the vehicle vibration levels to a number of possible vibration sources, and display a list of possible vibration sources on the display unit.

According to one exemplary embodiment, the above-mentioned vibration analysis system is configured for use by a service technician with little or no vibration training. Specifically, the vibration analysis system performs the analysis and computational tasks traditionally performed by vibration trained technicians and presents the results in a simple reporting format.

Additionally, an exemplary method for analyzing vibrations in a vehicle includes sensing vehicle vibrations, attributing sensed vibrations to common vibration sources, comparing sensed vibrations to predetermined threshold values, displaying possible sources of sensed vibrations, and displaying vibration repair recommendations when the sensed vibrations exceed a predetermined threshold value.

BRIEF DESCRIPTION OF THE DRAWINGS

Embodiments of the present system and method will now be described, by way of example, with reference to the accompanying drawings, wherein.

Throughout the drawings, identical reference numbers designate similar, but not necessarily identical, elements.

DETAILED DESCRIPTION

The present system and method provide a readily identifiable method for receiving, analyzing, and diagnosing sensed vibrations. More specifically, the present system and method are configured to receive various sensor measurements and to use the sensor measurements to identify major rotationally induced vibrations in real-time. While the vibrations may be induced by rotational mechanisms, the actual vibrations measured may include torsional and linear vibration. Additionally, the present system includes an electronic control unit configured to analyze the sensor measurements and generate a graphically represented recommendation aimed at reducing or remedying sensed vibrations that exceed a predetermined level. Consequently, technicians with little or no vibration analysis training may identify and resolve sensed vibration related issues. Further details of the present system and method will be given below with reference to the drawings.

Exemplary System Components

Figure 1A:
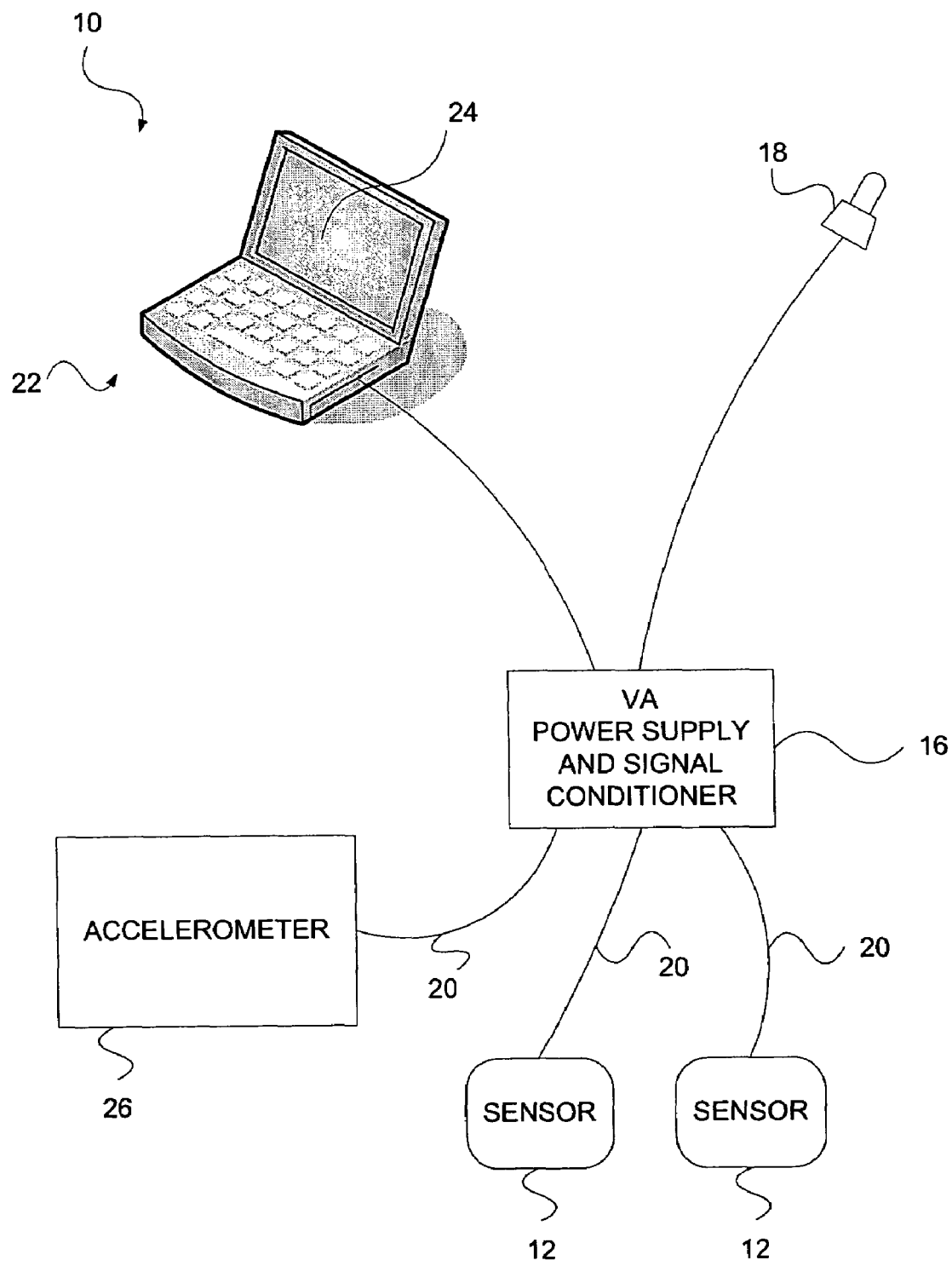
FIGS. 1A and 1B are schematic views of an exemplary vibration analysis system for a vehicle.

Turning now to the drawings, FIG. 1A illustrates a vibration analyzer system (10), according to one exemplary embodiment. As illustrated in FIG. 1A, the analyzer system (10) may include a number of sensors (12, 26) coupled to an electronic control unit (22) via a number of electrical leads (20) and a power supply and signal conditioner (16). As illustrated in FIG. 1, the electronic control unit (22) may also include a display unit (24) configured to graphically display results of the exemplary analyzer system (10). A 12-volt power coupler (18) may also be coupled to the power supply and signal conditioner (16). Further details of the exemplary vibration analyzer system (10) are described in detail below.

As illustrated in FIG. 1, in an exemplary embodiment the vibration analyzer system (10) includes a number of sensors (12) configured to measure the rotational movement of a particular driveline component(s). Measurement of rotational movement over time can be converted directly or indirectly into other forms of information including relative angular position, rotational velocity, or rotational acceleration. In the illustrated embodiment of the system (10), there are two sensors (12). In other embodiments, however, there could be as few as one sensor (12) or as many sensors (12) as can be found useful by the system (10). In some embodiments of the present exemplary vibration analyzing system (10), the sensors (12) are rotational velocity sensors including, but in no way limited to, a magnetic speed sensor, a non-contact magnetic sensor such as a variable reluctance sensor, an optical speed sensor, a mechanical speed sensor, or any other speed sensor configured to measure the rotational velocity of one or more vehicle drive components. Additionally, the sensors (12) may be configured to determine an angular position of a drive component, such as with the use of reference marks on the drive components. Further, various combinations of sensors (12) may be incorporated, according to various exemplary systems, including a number of sensors already present within most modern class 8 truck transmissions. Existing class 8 truck transmissions can provide a vehicle speedometer signal, and can be easily reached from the rear of the transmission.

Figure 1B:
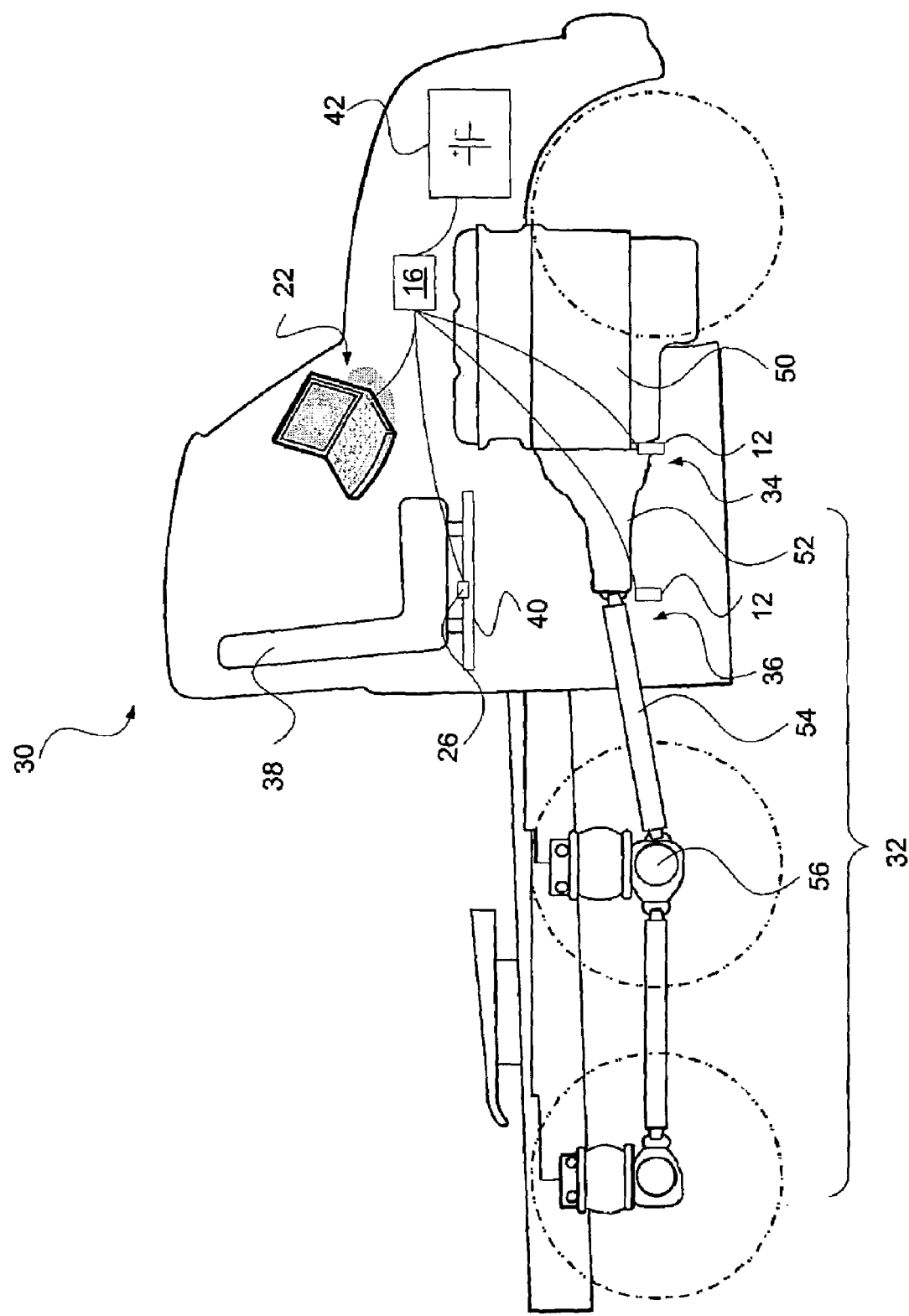

FIG. 1B illustrates placement of the exemplary vibration analyzing system (10) in a vehicle (30), according to one exemplary embodiment. As illustrated in FIG. 1B, sensors (12) are selectively positioned on the vehicle driveline (32) such that they may acquire engine flywheel (34) and transmission output (36) rotational movement data. According to this exemplary embodiment, determining the velocities of the engine flywheel (34) input and the transmission output (36) allows the present exemplary system to identify the gear of the transmission for further analysis. While the present exemplary embodiment is described herein as sensing and utilizing rotational movement data from an engine flywheel (34) and a transmission output (36), any number of rotational movement data points associated with one or more components may be measured and used as reference velocities for vibration analysis, as will be described in further detail below.

Continuing with FIGS. 1A and 1B, a sensor (26) in the form of a tri-axial accelerometer is coupled to the signal conditioner (16) via an electrical lead (20). According to the illustrated embodiment, the sensor (26) is configured to detect and measure accelerations in an X, a Y, and a Z direction, and combinations thereof. More specifically, with reference to a vehicle (30), the sensor (26) is configured to detect accelerations in the for-aft directions (X-axis), lateral directions (Y-axis), and the vertical directions (Z-axis). According to one exemplary embodiment, the sensor (26) includes a fully self conditioned tri-axial accelerometer having approximately +/−4 gravities (g) input range, about 500 millivolts per gram (mV/g) sensitivity, and approximately a 0.5 to 4.5 volt (V) output. Alternatively, sensors having various sensitivities and/or unconditioned signals may be incorporated by the present exemplary system. While sensor (26) in the form of a tri-axial accelerometer is illustrated, those skilled in the art will realize that other mechanisms that result in the real-time measurement or calculation of accelerations may also be used.

According to the exemplary embodiment illustrated in FIG. 1B, sensor (26) is disposed in a location of the vehicle (30) where vibrations are typically sensed by the vehicle operator. As shown, sensor (26) is coupled to the vehicle (30) under the vehicle operator's seat (38) on the seat track (40). While the sensor (26) is illustrated and described herein as being disposed under the vehicle operator's seat (38), it may be disposed in any number of locations on the vehicle (30) to determine accelerations from various perspectives.

As illustrated, the sensors (12) and the sensor (26) are communicatively coupled to a power supply and signal conditioner (16) via a number of electrical leads (20). The present exemplary vibration analyzing system (10) may incorporate different types of filtering devices or conditioning units to enhance, modify, or "clean" sensor measurements. Such devices are not required by the system (10), but may be used for providing inputs to the system. According to the exemplary embodiment illustrated in FIGS. 1A and 1B, an appropriate signal conditioning unit (16) is provided to filter and reduce noise in the signal output by the sensors (12) or (26). In some embodiments, a single unit (16) may support two or more sensors (12) as well as the sensor (26). In other embodiments, each signal conditioning unit (16) can support a single sensor (12) or sensor (26).

In some embodiments of the present vibration analyzing system (10), the signal conditioner (16) is connected to a power supply (42) by a cigarette lighter (18) in the vehicle (30). In other embodiments, the signal conditioner (16) may include an internal battery or some other independent power source. In other words the present vibration analyzing system (10) may utilize a wide variety of different power sources.

The electronic control unit ("ECU") (22) having a display unit (24) is configured to receive the sensor measurements from the above-mentioned sensors (12) and (26) that may be located at various locations in the vehicle (30). Once the measurements are received, the ECU is configured to generate and analyze relevant vibration attributes or characteristics and display a repair recommendation based on the received measurements. The ECU (22) may also include a data storage component (not shown) such as a memory module configured to store received sensor measurements such that the sensor measurements can be used for real-time measurements as well as post collection analysis.

In many embodiments, a laptop computer may serve as both the ECU (22) and the display unit (24). Alternatively, devices such as desktop computers, personal digital assistants, embedded computers, dedicated computers, and/or other devices can also be used by the present vibration analyzing system (10). FIG. 1 discloses a wired environment of the present vibration analyzing system (10), however, wireless technologies can also be incorporated into the present system to facilitate greater flexibility in the types of devices that can serve as the ECU (22). In the disclosed exemplary wired embodiment, sensors (12) and (26) are electrically coupled via a lead (20) to the microprocessor-based electronic control unit (ECU) (22). In most embodiments, each sensor (12) or (26) employed by the vibration analyzing system (10) will have its own lead (20). However, alternative embodiments may integrate the sensor measurements or otherwise compartmentalize a single lead (20) such that multiple sensors (12) can share a single lead. If the particular embodiment of the system (10) incorporates one or more signal conditioning units (16), the leads (20) may connect the sensors (12) and (26) to the signal conditioning unit (16) and the signal conditioning unit to the ECU (22). If, however, the particular embodiment of the system (10) does not include signal conditioning units (16), leads (20) may directly couple the sensors (12) and (26) to the ECU (22).

As mentioned above, the present vibration analyzing system (10) is configured to identify major rotationally related vibrations in real-time, including both torsional and linear vibration and generate graphically represented recommendations aimed at reducing or remedying sensed vibrations that exceed a pre-determined level. An exemplary method for using the vibration analyzing system (10) to detect vibrations and generate graphically represented recommendations aimed at reducing the detected vibrations will be described in further detail below with reference to FIGS. 2-7.

Exemplary Method

Figure 2:
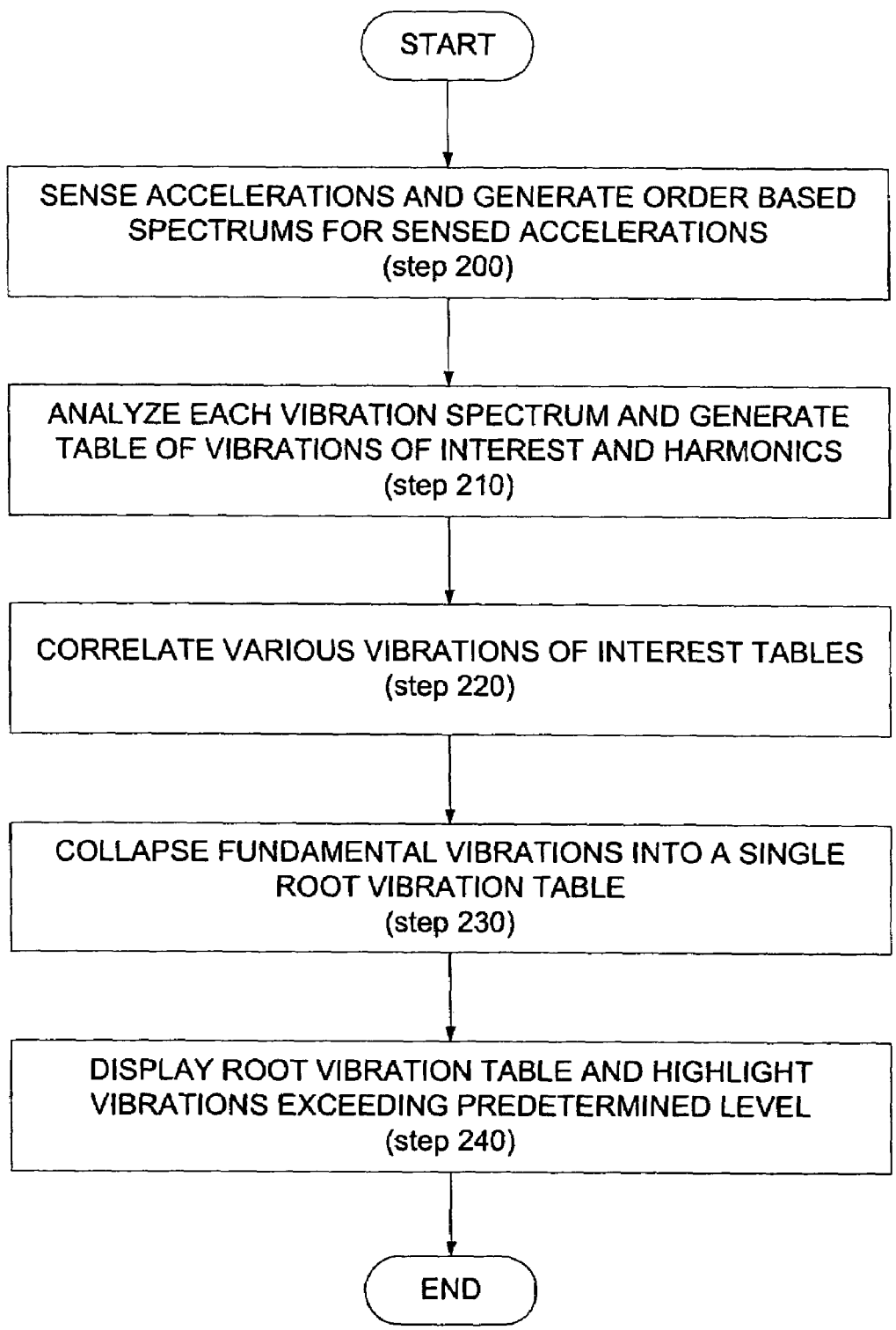
FIG. 2 is a flowchart generally illustrating an exemplary vibration analysis method performed by the vibration analysis system shown in FIGS. 1A and 1B.

With reference to FIG. 2 of the accompanying drawings, the exemplary method performed by the present vibration analyzing system (10) will now be described in detail. As illustrated in FIG. 2, the present exemplary vibration analyzing method begins by sensing or determining acceleration signals in multiple directions and generating order based spectrums for each of the sensed accelerations (step 200). Once the order based spectrums for each of the sensed accelerations are generated, each vibration spectrum is analyzed and a table of vibrations of interest and harmonics are generated for each order based spectrum (step 210). The multiple vibrations of interest tables are then correlated (step 220) to generate a single root vibration table (step 230). Once generated, the single root vibration table is then graphically displayed to a user to highlight vibrations exceeding predetermined threshold levels and to suggest possible remedies (step 240). According to one exemplary embodiment, the above-mentioned method is performed in real-time to provide the vehicle operator with technical information regarding vibrations they are likely sensing. Further details of the above-mentioned methods will be described below with reference to FIGS. 3 through 7.

Figure 3:
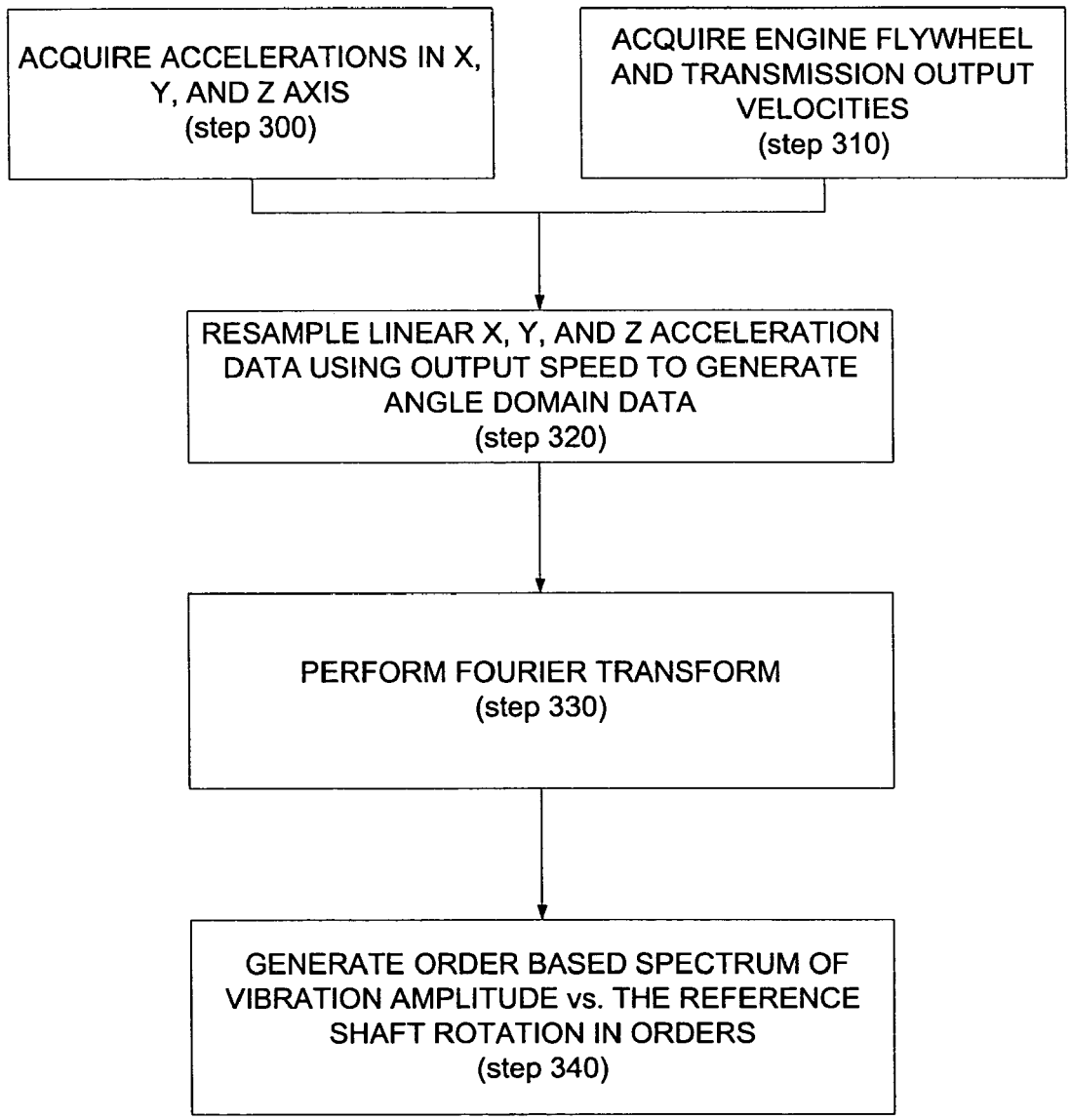
FIG. 3 is a flowchart illustrating a method for sensing accelerations and generating order-based spectrums, according to one exemplary embodiment.

As mentioned above, the present exemplary method begins by sensing or determining acceleration signals and generating order based spectrums for the real-time accelerations (step 200). FIG. 3 illustrates a method for generating order based spectrums from sensed accelerations according to one exemplary embodiment. As illustrated in FIG. 3, the accelerations sensed or determined using one or more sensors (26) in the X (fore-aft), Y (lateral), and Z (vertical) directions are received in the ECU (step 300) along with engine flywheel and transmission output sensed or determined rotational velocities (step 310).

As mentioned previously, when sensor (26) is an accelerometer (FIG. 1B), it may be positioned in a location of the vehicle (30; FIG. 1B) related to an operator. More specifically, the sensor or sensor(s) (26; FIG. 1B) may be positioned such that the sensed or determined accelerations will be the same as, or be related to the various accelerations sensed by a vehicle operator. According to this exemplary embodiment, the accelerations are sensed in the X, Y, and Z directions by the sensor (26; FIG. 1B) in real-time. According to one exemplary embodiment, the various accelerations detected by the sensor (26; FIG. 1B) are preconditioned within the accelerometer or other sensor and transmitted directly to the ECU (22; FIG. 1A), to be processed. Alternatively, the acceleration signals generated by the sensor(s) (26; FIG. 1B) may be passed to the signal conditioner (16; FIG. 1A) for conditioning prior to transmission to the ECU (22; FIG. 1A).

Simultaneously with the transmission of the detected or determined acceleration signals, the engine flywheel and transmission output velocities may be detected or determined and transmitted to the ECU for further processing (step 310). If necessary, the ECU may be used to determine acceleration or velocity from rotational movement acquired from sensors (12) or (26)

According to the exemplary configuration illustrated in FIG. 1B, the rotational velocities of the flywheel and transmission may be measured by any number of sensors (12). As illustrated in FIG. 1B, the rotational velocity signals generated by the various sensors (12) are conditioned by the signal conditioner (16; FIG. 1A) and passed to the ECU (22; FIG. 1A) as reference signals for further processing.

According to one exemplary embodiment, at least two reference velocities and positions, in this case the transmission output rotational velocity and position as well as the flywheel output rotational velocity and position, are used to resample the linear X, Y, and Z acceleration data using output speed and position to generate angle domain data (step 320). More particularly, by coordinating the angular rotational velocity and position measurements obtained by the sensors (12; FIG. 1B) with substantially temporally consistent acceleration signals obtained by the sensor(s) (26; FIG. 1B) in the form of the acceleration measurements performed by a tri-axial accelerometer may be represented in the angle domain, based on the measured angular position of the transmission output and the engine flywheel.

With the linear acceleration data represented as angular domain data (step 320), the ECU (22; FIG. 1A) performs a discrete Fourier transform or a fast Fourier transform on the angular domain data (step 330) to generate an order based spectrum of vibration amplitude vs. orders of the reference shaft rotation (step 340). More specifically, because the acceleration measurements or determinations illustrated above are evenly spaced in terms of the transmission output and engine flywheel rotation angle, application of a discrete or fast Fourier transform to the angle domain rotational velocity data or determination results in a transformation of data into the order domain. While this can be accomplished in any suitable method, the presently preferred embodiment may incorporate a commonly available commercial FFT (fast Fourier transform) software package configured to run on the ECU (22; FIG. 1B). The Fourier transformation may be particularly useful since it enables calculation of the torsional displacement and acceleration magnitudes in the driveline as a function of the harmonic order of rotation of the driveshaft and/or other driveline components.

Since the rotational velocity measurements collected by the sensors (12; FIG. 1B) are evenly spaced in terms of a change in rotational angle, T, application of a discrete Fourier transform to this angle domain data results in transformation into the order domain. As the acceleration input or determination data contains real values only, the double sided FFT (positive as well as negative order) block has real and imaginary components which are equal. Disregarding the negative order data, the FFT function puts the real and imaginary components Rj and Ij into separate blocks having total of 1+N/2 elements with index j=0, 1, . . . , N/2.

A result of the above-mentioned Fourier transform is a listing of acceleration data in the order domain. Consequently, the acceleration data represented in the order domain may then be used to generate an order-based spectrum of vibration amplitude vs. the reference shaft rotation in orders (step 340). According to the present exemplary embodiment, an order-based spectrum of vibration amplitude vs. the reference shaft rotation may be generated for each direction sensed by the sensor(s) (26; FIG. 2). Specifically, the acceleration data in the order domain produced by the above-mentioned Fourier transform may remain separated according to the source X, Y, and Z acceleration data. Each of these groups of acceleration data in the order domain may then be used to produce an order-based spectrum of vibration amplitude vs. the reference shaft rotation. As mentioned previously, the reference shaft rotation is based on the engine flywheel and transmission output shaft rotations, however any number of drive train components may be used to provide the reference shaft rotation(s).

Figure 4:
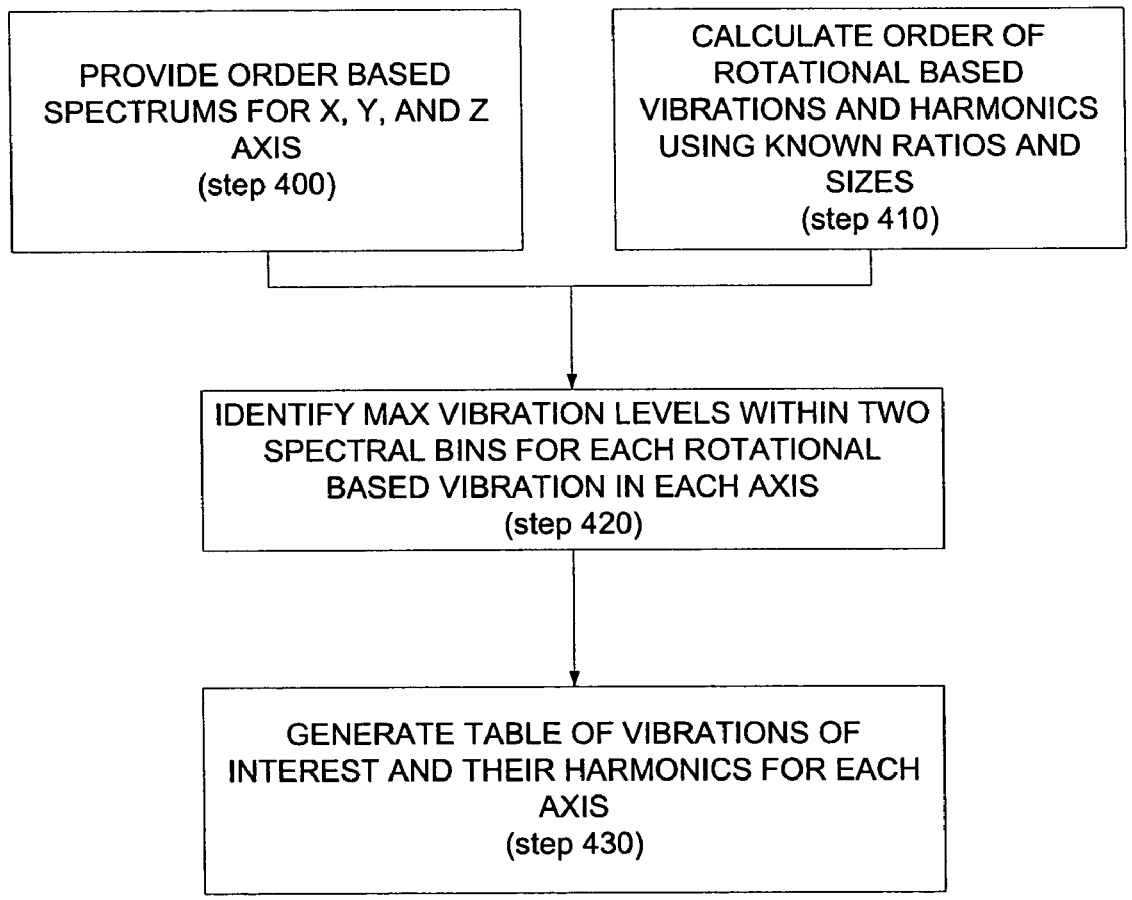
FIG. 4 is a flowchart illustrating a method of generating a table of vibrations and harmonics of interest, according to one exemplary embodiment.

Once the order based spectrums for the sensed accelerations have been generated (step 200; FIG. 2), the present exemplary method continues by analyzing each generated vibration spectrum and generating a table of vibrations of interest and their harmonics (step 210), described in further detail with reference to FIG. 4. As shown in FIG. 4, the previously generated order-based spectrums for the sensed accelerations in the X, the Y, and the Z direction are provided (step 400) to allow for the real-time analyzing of the generated vibration spectrums. Additionally, the ECU (22; FIG. 1B) calculates the order of common rotationally-based vibrations and harmonics using known gearing, ratios, and sizes of the various components of the driveline (step 410).

More specifically, the order of torsional and linear based vibrations and harmonics for various rotational components of the driveline (32; FIG. 1B) may be calculated based on the anticipated rotational output velocity of the identified components. Similarly the anticipated rotational output velocity of the identified components may be calculated using known or measured quantities such as transmission rotational output velocity, engine cylinders, flywheel rotational velocity, gear ratios, tire size, and/or axle size.

Common rotationally-based vibrations include both torsional and linear vibrations. Typically, driveline torsional vibration is induced from two primary sources: engine torsional excitations occurring at the fundamental engine firing frequency and its harmonics, and universal joints operating with non-zero working angles. The drive train system responds to this torsional excitation by dynamically winding and unwinding. A certain amount of this torsional activity is always present and generally represents no danger to driveline components. However, if the excitation frequency is coincident with a driveline torsional resonant frequency, serious amplification of driveline torsionals can occur.

In addition to the above-mentioned driveline torsional vibrations, a number of linear vibrations may be caused by rotational driveline sources such as, but in no way limited to, wheel-end, axle, or propshaft issues. According to one exemplary embodiment, the present exemplary system and method identifies the order of vibrations and harmonics for vibrations generated by the engine (50; FIG. 1B), the propshaft (54; FIG. 1B), the U-joint, the axle (56; FIG. 1B), and the wheel-ends of a vehicle (30; FIG. 1B).

Specifically, according to one exemplary embodiment, the 0.5, 1.0, 1.5, and 2.0 order of vibrations and harmonics of the internal combustion engine (50; FIG. 1B) are identified. The internal combustion engine (50; FIG. 1B) is the most dominant torsional exciter in the driveline (32; FIG. 1B). The combustion process produces a dynamic torque waveform which creates oscillatory driveline dynamic torque and torsional displacements. The engine dynamic torque waveform is comprised mostly of the fundamental engine firing frequency, but there is also a measurable torque component at the 0.5, 1.5 and 2.0 harmonics of the engine firing frequency. For a typical four-cycle six cylinder engine, firing occurs three times per crankshaft revolution (3rd order). The 0.5, 1.5 and 2.0 harmonics would therefore represent the 1.5, 4.5 and 6.0 crankshaft orders, respectively.

Additionally, the 1.0 order of vibration of the propshaft (54; FIG. 1B) is identified, based on the above-mentioned information. Often tangible frequencies are generated by the propshaft. Similarly, the 1.0 order of vibration of the axle (56; FIG. 1B) is identified for real-time vibration analysis.

The 1.0 and 2.0 vibration orders of the universal joints (U-joints) and the wheel-end component are calculated, according to one exemplary embodiment. Vibration generating non-zero working angles in universal joints will include an oscillatory output rotational speed given a constant input rotational velocity, varying at the rate of two cycles per shaft revolution. Similarly, second order accelerations may occur at the wheel-end components. Consequently, first order and second order accelerations are of interest for the driveline components. Significant torsional accelerations in the second order are indicative of non-zero U-joint working angles.

Once the above-mentioned rotational based vibrations and harmonics are calculated (step 410), the ECU (22; FIG. 1A) may analyze the generated X, Y, and Z order based spectrums and identify maximum vibration levels within two spectral bins for each common rotational based vibration of interest identified above in each axis (step 420). With the maximum vibration levels identified for each of the vibrations of interest in each of the X, Y, and Z directions, the present exemplary system generates tables of vibrations of interest and their harmonics for each measured axis (step 430). More specifically, a table of vibrations of interest and their harmonics is generated as the level of the vibration vs. the order of the vibration.

Figure 5:
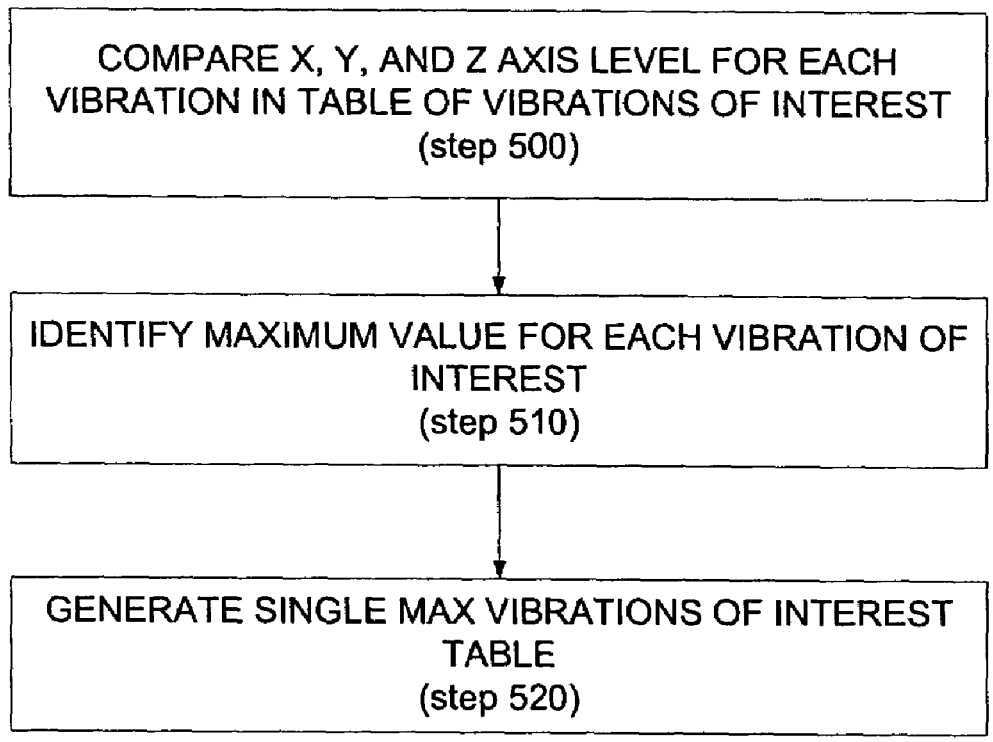
FIG. 5 is a flowchart illustrating a method of generating a root vibrations of interest table, according to one exemplary embodiment.

Returning to FIG. 2, once the measured vibrations of interest tables are generated for each of the X, Y, and Z directions, the various vibrations of interest tables may be correlated (step 220) and the maximum vibrations for each vibration of interest, regardless of direction, may be collapsed into a single root vibration table (step 230), as illustrated in FIG. 5. As shown in FIG. 5, the X, Y, and Z axis level for each vibration of interest is compared (step 500). When compared, the maximum value of each vibration of interest is identified as between the X, Y, and Z axis level (step 510) and used to generate a single table containing the maximums for each vibration of interest in the various sensed directions (step 520).

Referring again to FIG. 2, the generation of a table containing the maximums for each vibration of interest regardless of the sensed directions (step 230) facilitates a display of a root vibration table highlighting vibrations exceeding a predetermined level and making recommendation of how to remedy the situations (step 240).

Figure 6:
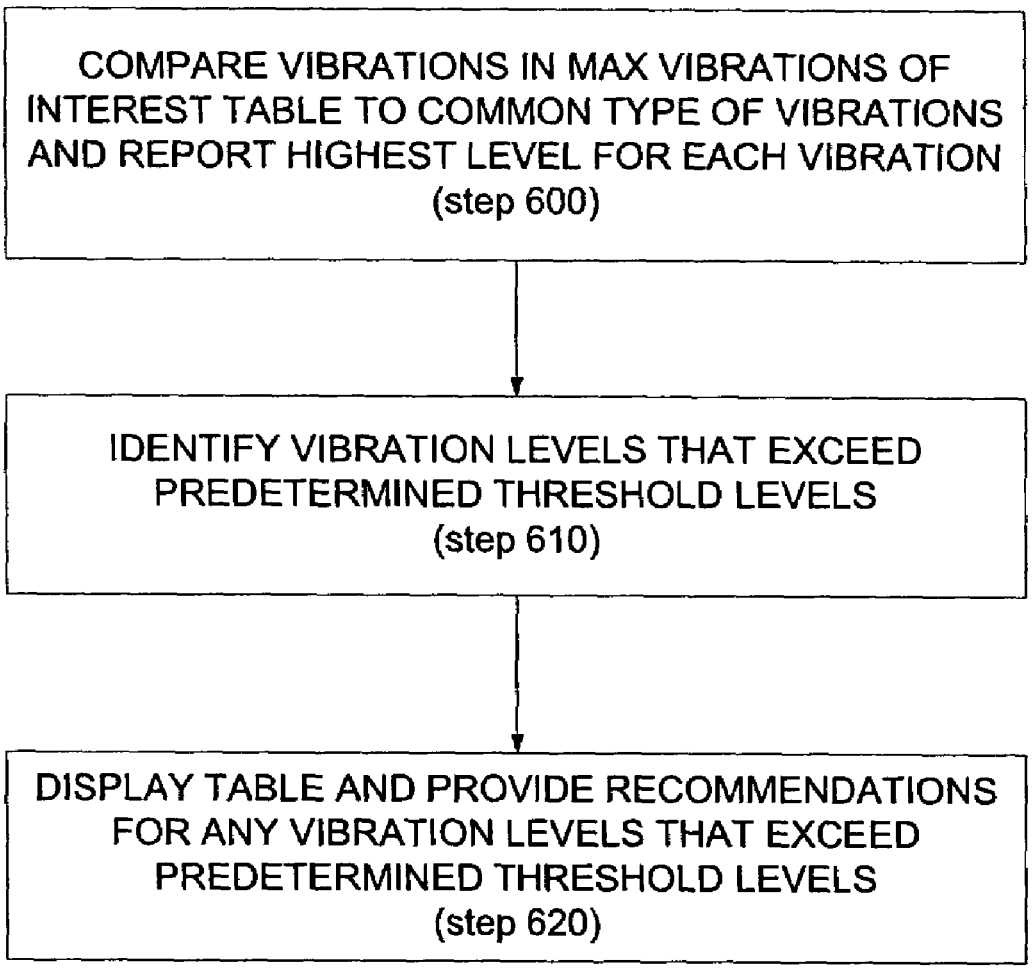
FIG. 6 is a flow chart illustrating a method of identifying and displaying root vibrations exceeding a predetermined value, according to one exemplary embodiment.
Figure 7:
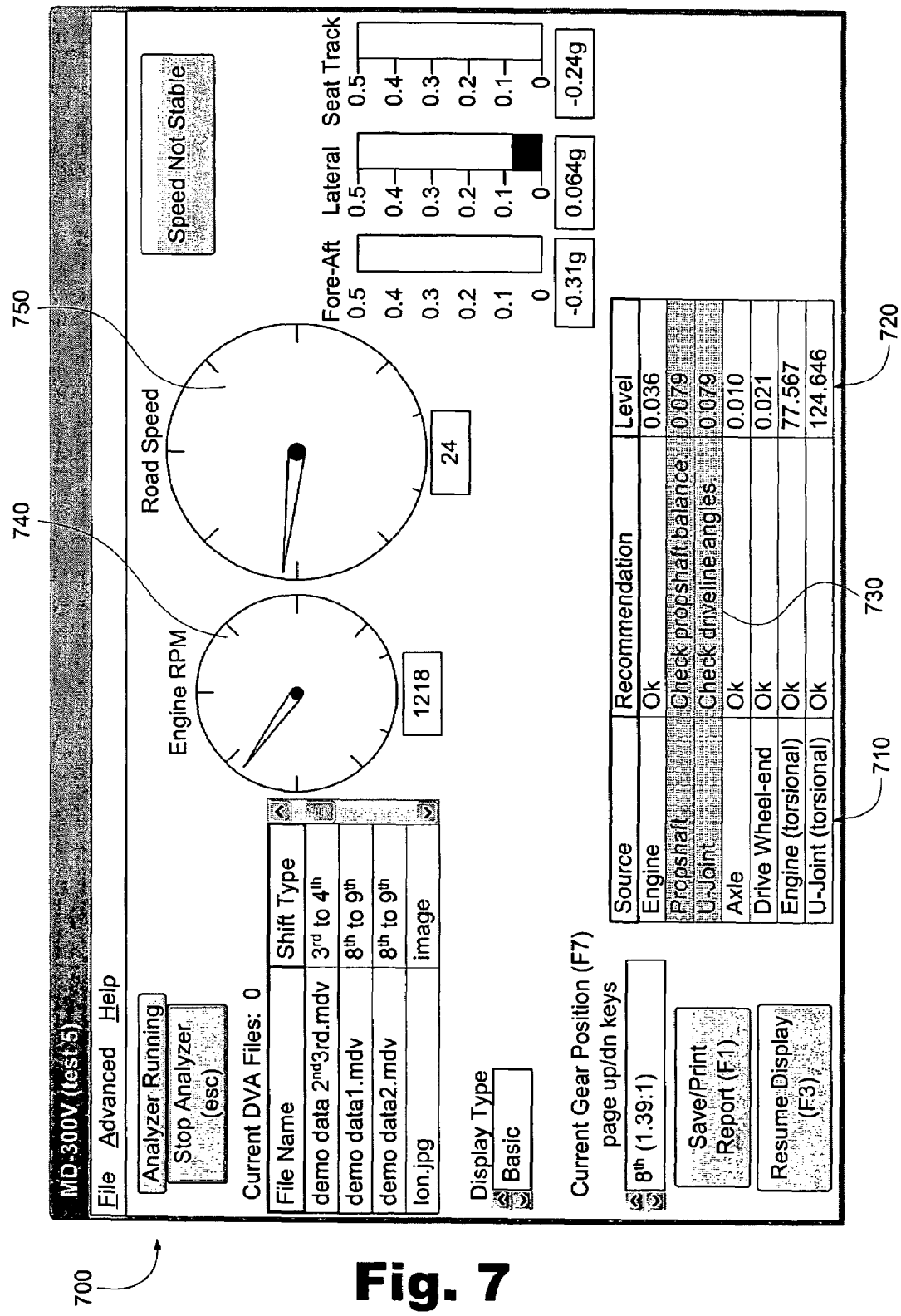
FIG. 7 is a frontal view of a graphical user interface used to display at least one possible vibration source during vehicle operation, according to one exemplary embodiment.

FIGS. 6 and 7 illustrate the generation of the table described in step 240 according to a number of exemplary embodiments. As illustrated in FIG. 6, the ECU (20; FIG. 1A) may compare the max vibrations listed in the above-mentioned maximum vibrations of interest table to a common type of vibrations and report the highest level for each of the common types of vibration (step 600). More specifically, the above-mentioned method for generating the maximum vibrations of interest table analyzes a plurality of vibration orders corresponding to a common vibration type. The present exemplary system then selects a maximum vibration for each common vibration type, based on amplitude. The present exemplary embodiment then reports the highest level seen for each vibration type. By way of explanation only, when the present exemplary embodiment looks for a U-joint $1^{st}$ and $2^{nd}$ harmonic, the amplitude for each of the vibrations will be compared and the largest will be reported as the representative "U-joint" vibration.

Once a table of common vibrations and their highest representative vibration levels is generated, the present exemplary method compares the detected vibration levels of each common vibration to a predetermined table of acceptable vibration levels. When the vibration levels are compared, the ECU (20; FIG. 1A) may identify vibration levels that exceed predetermined vibration threshold levels (step 610). Once the vibration levels that exceed predetermined levels are identified, they may be displayed to a user, along with a recommendation (step 620). According to one exemplary embodiment, when a vibration in excess of a predetermined level is identified, the identified vibration is rendered to a fault table of possible causes to pursue. These possible causes are then displayed to a user to help the user, often a technician, take actions to remedy the unacceptable vibration levels. Thus, according to the present exemplary embodiment, the ECU (20; FIG. 1A) performs the wave analysis typically performed by a vibrations expert. By performing the above-mentioned analysis and identifying possible causes for the undesirable vibration, a technician having little or no vibration training may identify and repair the cause of unacceptable vibrations.

FIG. 7 illustrates one embodiment of an exemplary graphical user interface (GUI) (700) displaying a number of vibration levels, identifying vibration levels that exceed a threshold level, and providing a repair recommendation. As illustrated in FIG. 7, the exemplary GUI (700) includes a listing of the possible vibration sources (710) being detected and their maximum measured vibration levels (amplitudes) (720). The detected vibrations that are determined to have exceeded the appropriate vibration levels are highlighted and accompanied by a recommendation for repair (730). Additionally, other operational parameters may be displayed by the exemplary GUI to illustrate operating conditions of the vehicle as the exemplary method is performed in real-time. As shown, the vehicle engine RMP (740) and road speed (750) may be graphically displayed to further aid in diagnosis of the vibration origins. According to one exemplary embodiment, each screen shot of the GUI is stored in a memory component of the ECU (20; FIG. 1B) for further analysis and review at a later time.

ALTERNATIVE EMBODIMENT

According to one exemplary alternative embodiment, the present system and method may also include an advanced display and production option. According to this alternative embodiment, the results of the order based spectrums for sensed accelerations are not only graphically represented for use by a non-vibration trained technician, but the order based spectrums, and their associated data may be preserved and presented to a vibrations expert for analysis.

According to this alternative embodiment, the ECU (20; FIG. 1B) may also generate and graphically display speed and acceleration time domain data and corresponding torsional and linear spectrums in real time. Additionally, the major vibration types are identified both on the spectrum and in the vibration table.

Further, the alternative embodiment may provide for post operation analysis of the detected vibrations and their characteristics by storing collected data on a processor readable storage medium. According to this exemplary embodiment, the acceleration data may be sensed and recorded in real-time to a data storage device such as an internal memory or a disk. Then, when desired by a technician, the recorded data may be played back and/or analyzed by a vibration trained service technician for torsional and linear vibrations.

In conclusion, the present system and method perform real-time and fully automatic vibration analysis of both torsional and linear vibrations associated with rotational components, reporting the results in a simple table of possible vibration sources. Consequently the present system and method may be used by a non-vibration trained service technician to diagnose and remedy vibration sources.

The present exemplary system and method have been particularly shown and described with reference to the foregoing embodiments, which are merely illustrative of the best modes presently established for carrying out the system and method. It should be understood by those skilled in the art that various alternatives to the embodiments of the system and method described herein may be employed in practicing the system and/or method, without departing from the spirit and scope thereof as defined in the following claims. It is intended that the following claims define the scope of the system and method and that the systems and methods within the scope of these claims and their equivalents be covered thereby. This description of the system and method should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A tool for measuring and analyzing vibrations in a vehicle having an operator seat, comprising:
a plurality of rotational velocity sensors configured to measure a rotational velocity of at least one driveline member;
a tri-axial accelerometer configured to be coupled to said operator seat;
a processing unit including a display and a processor electrically coupled to said plurality of rotational velocity sensors and to said tri-axial accelerometer; and
wherein said processing unit is configured to receive acceleration signals from said tri-axial accelerometer, receive rotational velocity signals from said plurality of rotational velocity sensors, determine vehicle vibration levels from said acceleration signals and said rotational velocity signals, attribute said vehicle vibration levels to possible vibration sources, and display said possible vibration sources;
wherein said processing unit is further configured to:
house a list of acceptable vibration thresholds based on vibration type and amplitude;
compare said vehicle vibration levels to said list of acceptable vibration thresholds;
determine if one of said vehicle vibration levels exceeds one of said acceptable vibration thresholds; and
if one of said vehicle vibration levels exceeds one of said acceptable vibration thresholds, display a possible remedy to reduce said threshold exceeding vehicle vibration level.

2. The tool of claim 1, wherein said processing unit is configured to detect both linear vibrations and torsional vibrations associated with a driveline of said vehicle.

3. The tool of claim 1, wherein said processing unit is further configured to selectively display torsional and linear spectrums associated with said acceleration signals.

4. The tool of claim 1, wherein said plurality of rotational velocity sensors comprise a first sensor and a second sensor;
said first sensor being configured to measure a rotational velocity of a transmission output; and
said second sensor being configured to measure a rotational velocity of an engine flywheel.

5. The tool of claim 4, wherein said processing unit is configured to determine a transmission gear based on data received from said first sensor and said second sensor.

6. The tool of claim 1, wherein said tri-axial accelerometer is configured to be coupled to a seat track of said operator seat.

7. The tool of claim 1, wherein said processing unit is configured to save said vehicle vibration levels in a memory component for future analysis.

8. A method for analyzing vibration in a vehicle having a plurality of seats, comprising:
  sensing vehicle vibrations with a tri-axial accelerometer disposed on one of said plurality of seats;
  attributing said sensed vibrations to common vibration sources;
  comparing said sensed vibrations to predetermined threshold values, said threshold values varying according to vibration type and amplitude;
  displaying said common sources of sensed vibrations attributed to said sensed vibrations; and
  displaying a vibration repair recommendation when said sensed vibrations exceed a predetermined threshold value;
  wherein attributing sensed vibrations to common vibration sources includes generating order based spectrums for said sensed vibrations, calculating orders of common rotational based vibrations at operating conditions, and correlating orders based spectrums of said sensed vibrations with said calculated common rotational based vibrations; and
  wherein said generating order based spectrums for said sensed vibrations includes collecting a plurality of rotational velocity measurements from a first and second sensor disposed on reference shafts of a drive train of said vehicle, re-sampling collected acceleration data with said rotational velocity measurements to generate angle domain data, performing a Fourier transform on said angle domain data, and plotting vibration amplitude verses a reference shaft rotation in orders.

9. The method of claim 8, wherein said Fourier transform comprises one of a discrete Fourier transform or a fast Fourier transform.

10. A method for analyzing vibrations in a vehicle having a drive line, comprising:
  determining a plurality of predetermined threshold values based on vibration type and amplitude;
  collecting a plurality of rotational velocity measurements from a first and a second sensor disposed on said drive line;
  collecting a plurality of acceleration measurements in a plurality of axes;
  generating an order based spectrum from said plurality of acceleration measurements for each of said axes;
  calculating orders of a plurality of vibrations of interest;
  generating a root vibration table associating said rotational velocity measurements to said vibrations of interest;
  comparing said root vibration table to said predetermined threshold values;
  displaying said root vibration table;
  highlighting vibrations in said root vibration table that exceed said predetermined threshold values; and
  displaying suggested remedies for vibrations in said root vibration table that exceed said predetermined threshold values.

* * * * *